Patented Oct. 20, 1942

2,299,213

UNITED STATES PATENT OFFICE 2,299,213

SUBSTITUTED ARYLOXYALKYLOL SULPHIDES

Elmer W. Cook, New York, N. Y., and William D. Thomas, Jr., Stamford, Conn., assignors to American Cyanamid Company, New York, N. Y., a corporation of Maine No Drawing. Application November 29, 1941, Serial No. 421,035

11 Claims. (Cl. 260—609)

This invention relates to new organic compounds and their preparation; more particularly to alkyl and cycloalkyl substituted aryloxyalkylol sulphides.

The alkyl and cycloalkyl substituted aryloxyalkylol sulphides described and claimed herein by us may be represented by the general formula:

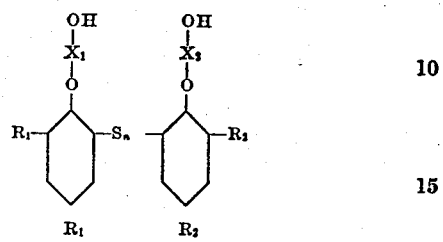

in which $X_1$ and $X_2$ are alkylene radicals containing 2 to 4 carbon atoms inclusive, $n$ is a positive integer not more than 2, and $R_1$ and $R_2$ are members of the group consisting of alkyl, cycloalkyl, and hydrogen radicals, at least one $R_1$ and at least one $R_2$ being a member of the group consisting of alkyl and cycloalkyl radicals.

We have found that these alkyl and cycloalkyl substituted aryloxyalkylol sulphides are good corrosion inhibitors, particularly when dissolved in lubricating oils and may be employed to great advantage therein in the preparation of heavy duty crankcase oils. In adidtion to being excellent corrosion inhibitors in lubricating oils the compounds of the present invention exhibit detergent and dispersing properties and reduce the formation of sludge, ring sticking, varnish deposition and other undesirable conditions which develop when the lubricating oil is subjected to heavy duty service. They are also of value in the preparation of fly sprays, fungicides, wetting agents, dispersing agents, plasticizers, corrosion-resistant slushing oils and like compositions.

The alkyl and cycloalkyl substituted aryloxyalkylol sulphides of our invention are prepared by reacting an alkyl or cycloalkyl substituted aryloxyalkylol compound with sulphur chloride or sulphur dichloride depending upon the type of sulphide desired as the reaction product. The alkyl and cycloalkyl substituted aryloxyalkylol compounds which we employ in our reaction have the general formula

in which X is an alkylene group of 2 to 4 carbon atoms such as —$CH_2$—$CH_2$—.

$$-CH-CH_2-\\ |\\ CH_3$$

—$CH_2CH_2CH_2$—, etc. and $R_1$ may be hydrogen, an alkyl radical of from 1 to 14 carbon atoms such as methyl, ethyl, propyl, isopropyl, butyl, isobutyl, n-amyl, tert.-amyl, ethyl hexyl, n-octyl, etc. or a cycloaliphatic radical such as cyclopentyl, cyclohexyl, methyl cyclohexyl, dimenthyl cyclohexyl, and the ethyl, propyl, butyl and amyl mono-, di- and tri-substituted cyclohexyl radicals, etc. Preferably both R's are either alkyl or cycloalkyl radicals. It is permissible, however, to use compounds in which one of the R's may be hydrogen but the resulting products show a decreased solubility in lubricating oils.

We prefer to prepare the monosulphides of the present invention by reacting approximately 2 moles of an alkyl or cycloalkyl aryloxyalkylol with one mole of sulphur dichloride ($SCl_2$) in the presence of a small amount, for example 0.2 mole, of anhydrous aluminum chloride as catalyst. Other Friedel-Craft catalysts such as $SbCl_5$, $FeCl_3$, $TeCl_2$, $SnCl_4$, $TiCl_4$, $TeCl_4$, $BiCl_3$, and $ZnCl_2$ may also be employed as catalysts in our reaction with decreasingly effective results. The disulphides are prepared in the same manner by substituting sulphur chloride ($S_2Cl_2$) in place of sulphur dichloride.

The reaction may be illustrated with 2,4-ditert. butyl phenoxy ethanol and sulphur dichloride as follows:

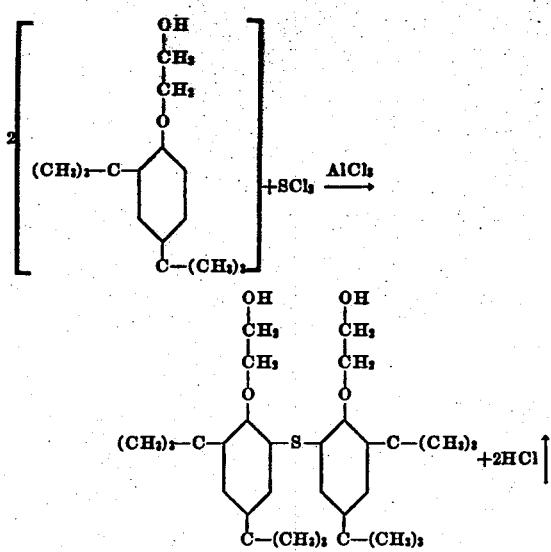

Ordinarily we carry out the reaction with the reactants dissolved in a suitable solvent such as carbon disulphide, petroleum naphtha, nitrobenzene, ethylene chloride, etc. The reaction mixture with the catalyst present is then heated until the evolution of HCl has substantially stopped. The mixture is then treated with cool dilute HCl, or other acid such as sulphuric, acetic, etc., and the product recovered by extraction with toluene or other suitable solvent. The product can be purified by washing with water, in which it is insoluble, and the solvents removed by evaporation.

It will be understood of course that the preparation of the disulphides with sulphur chloride proceeds in the same way under the same reaction conditions. It will also be understood that the cycloalkyl substituted aryloxyalkylols may be employed in place of the 2,4-di-tert. butyl phenoxy ethanol illustrated in the above equation in the same manner and using the same molecular proportions.

Metal salts of these compounds may also be prepared by reacting the compounds just described with appropriate molecular amounts of finely powdered metallic aluminum, metallic magnesium turnings, calcium metal, etc. A small amount of mercury chloride may be added to start the reaction. The reaction mixture may be gently heated on a steam bath at first but may require cooling later because of the exothermic character of the reaction. Metal salts may also be prepared by heating the compounds described with an alcoholate of a lower boiling alcohol, sodium methylate for example, under conditions such that the lower alcohol is driven off. The aluminum salts of 2,4-diamyl phenoxy ethanol monosulphide, for example, may be prepared by this method.

The preparation of 2,4-diamyl phenoxy ethanol monosulphide will now be described in detail in the following example in which particular parts by weight, solvents, etc. are given primarily for purposes of illustration. Our invention is not to be limited to the particular compound described, however, since as stated above the invention in its broader aspects is not limited thereto.

*Example*

56 parts by weight of 2,4-diamyl phenoxy ethanol was dissolved in 50 parts of carbon disulphide and 10.5 parts by weight of sulfur dichloride dissolved in 10 parts of carbon disulphide was added thereto with stirring. 3 parts by weight of anhydrous aluminum chloride was then added and the mixture stirred and warmed gently under a reflux condenser on a steam bath for 30 minutes. At the end of this time the evolution of hydrogen chloride had practically stopped and the reaction mixture was then cooled and stirred with cold dilute hydrochloric acid. 60 parts by weight toluene was then added and the organic layer separated and washed three times with water. The solvent was then evaporated leaving 2,4-diamyl phenoxy ethanol monosulphide as an orange-red oil, easily soluble in gasoline and lubricating oils but only slightly soluble in water.

What we claim is:

1. Chemical compounds having the general formula

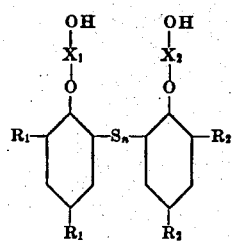

in which $X_1$ and $X_2$ are alkylene radicals containing 2 to 4 carbon atoms inclusive, $n$ is a positive integer not more than 2, and $R_1$ and $R_2$ are members of the group consisting of alkyl, cycloalkyl, and hydrogen radicals, at least one $R_1$ and at least one $R_2$ being a member of the group consisting of alkyl and cycloalkyl radicals.

2. Chemical compounds having the general formula

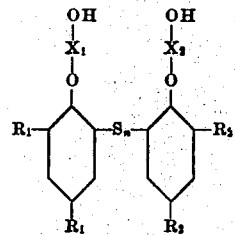

in which $X_1$ and $X_2$ are alkylene radicals containing 2 to 4 carbon atoms inclusive, $n$ is a positive integer not more than 2, and $R_1$ and $R_2$ are alkyl radicals.

3. Chemical compounds having the general formula

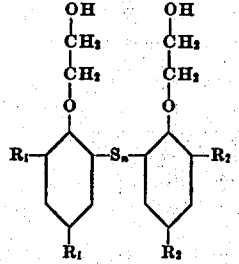

in which $n$ is a positive integer not more than 2, and $R_1$ and $R_2$ are alkyl radicals.

4. Chemical compounds having the general formula

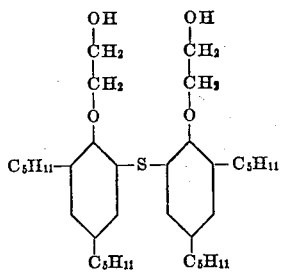

5. Chemical compounds having the general formula

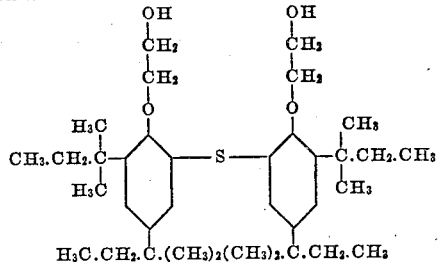

6. Chemical compounds having the general formula

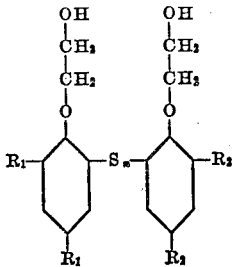

in which $n$ is a positive integer not more than 2, and $R_1$ and $R_2$ are cyclohexyl radicals.

7. A method of preparing alkyl and cycloalkyl substituted aryloxy-alkylol sulphides which comprises reacting a member of the group consisting of alkyl aryloxyalkylols and cycloalkyl aryloxyalkylols with a member of the group consisting of sulphur chloride and sulphur dichloride in the presence of a catalyst.

8. A method of preparing alkyl substituted aryloxyalkylol sulphides which comprises reacting alkyl aryloxyalkylols with a member of the group consisting of sulphur chloride and sulphur dichloride in the presence of a catalyst.

9. A method of preparing cycloalkyl substituted aryloxyalkylol sulphides which comprises reacting cycloalkyl aryloxyalkylols with a member of the group consisting of sulphur chloride and sulphur dichloride in the presence of a catalyst.

10. A method of preparing di-(2,4-diamyl) phenoxy ethanol monosulphide which comprises heating 2,4-diamyl phenoxy ethanol with sulphur dichloride in the presence of a Friedel-Crafts catalyst until the evolution of HCl has substantially stopped.

11. A method of preparing di-(2,4-di-tert. amyl) phenoxy ethanol monosulphide which comprises heating 2,4-di-tert. amyl phenoxy ethanol with sulphur dichloride in the presence of a Friedel-Crafts catalyst until the evolution of HCl has substantially stopped.

ELMER W. COOK.
WILLIAM D. THOMAS, JR.